(12) United States Patent
Thompson

(10) Patent No.: US 6,953,408 B2
(45) Date of Patent: Oct. 11, 2005

(54) ELECTRIC DRIVE CONFIGURATION FOR A SKID STEERED VEHICLE

(75) Inventor: Robert William Thompson, Farnborough (GB)

(73) Assignee: Qinetiq Limited (GB)

( * ) Notice: Subject to any disclaimer, the term of this patent is extended or adjusted under 35 U.S.C. 154(b) by 0 days.

(21) Appl. No.: 10/474,923

(22) PCT Filed: Apr. 17, 2002

(86) PCT No.: PCT/GB02/01721
§ 371 (c)(1),
(2), (4) Date: Oct. 15, 2003

(87) PCT Pub. No.: WO02/083482
PCT Pub. Date: Oct. 24, 2002

(65) Prior Publication Data
US 2004/0121871 A1 Jun. 24, 2004

(30) Foreign Application Priority Data
Apr. 17, 2001 (GB) ............................................. 0109338

(51) Int. Cl.$^7$ .......................... F16H 3/72; B62D 11/06; B62D 11/00
(52) U.S. Cl. .............................. 475/5; 475/18; 180/6.44
(58) Field of Search .............................. 475/18, 29, 30, 475/204–5, 21–23; 180/6.44, 6.48, 65.5–65.6, 371–2, 244–8

(56) References Cited
U.S. PATENT DOCUMENTS

| | | | | |
|---|---|---|---|---|
| 2,730,182 A | | 1/1956 | Sloane | |
| 3,303,723 A | * | 2/1967 | Ruf .............................. | 475/27 |
| 3,783,963 A | * | 1/1974 | Erwin ......................... | 180/6.3 |
| 4,271,918 A | * | 6/1981 | Molby ......................... | 180/6.48 |
| 4,718,508 A | * | 1/1988 | Tervola ....................... | 180/6.44 |
| 4,998,591 A | | 3/1991 | Zaunberger | |
| 5,026,333 A | | 6/1991 | Meyerle | |
| 5,168,946 A | | 12/1992 | Dorgan | |
| 5,545,098 A | | 8/1996 | Zulu | |
| 5,680,908 A | * | 10/1997 | Reed .......................... | 180/65.3 |
| 5,921,338 A | * | 7/1999 | Edmondson ................ | 180/65.5 |
| 6,325,736 B1 | * | 12/2001 | Hamada et al. ............... | 475/18 |

FOREIGN PATENT DOCUMENTS

| | | |
|---|---|---|
| GB | 1317313 | 5/1973 |
| GB | 2 203 106 | 10/1988 |
| GB | 2 233 942 | 1/1991 |
| GB | 2 308 344 | 6/1997 |

OTHER PUBLICATIONS

Ogorkiewicz, "Electric Dive GD's Novel EVTB", *International Defense Review* vol. 22, pp. 1161–1162 (1989).

* cited by examiner

Primary Examiner—Roger Pang
(74) Attorney, Agent, or Firm—McDonnell Boehnen Hulbert & Berghoff LLP

(57) ABSTRACT

An electric drive configuration for a tracked vehicle comprises a pair of propulsion motors (1a, 1b) each in operable communication with one of a first pair of track drive sprockets (3a, 3b) for driving a pair of tracks (4a, 4b) of the tracked vehicles; a steer motor (5) in driveable communication with a controlled differential steer gear unit (6) positioned centrally of a pair of steering cross-shafts (7a, 7b) and in driveable communication with each shaft, the opposing ends of the steering cross-shafts (7a, 7b) being each in operable communication with one of a second pair of track drive sprockets (9a, 9b) for controlling the relative speeds of the two track to steer the tracked vehicle; the first pair of track drive sprockets (3a, 3b) being engageable with the tracks (4a, 4b) at a first end of a tracked vehicle and the second pair of track drive sprockets (9a, 9b) being engageable with the tracks at a second end of the tracked vehicle.

14 Claims, 4 Drawing Sheets

ELECTRIC DRIVE CONFIGURATION FOR A SKID STEERED VEHICLE

The present invention relates to a novel drive-configuration for skid steered vehicles, including tracked or wheeled vehicles, for example but not limited to, a military armoured tank.

A skid steered tracked vehicle is steered by forcing the two tracks to run at different speeds. In the same way, a wheeled skid steered vehicle is steered by forcing wheels on one side of the vehicle to run at different speeds to the wheels on the other side of the vehicle. For tracked vehicles large driving force differences are required between the two tracks—large braking forces on the inner track and high driving forces on the outer track. This results in very high mechanical powers at individual track sprockets particularly when the vehicle is running at medium to high speeds. These high powers are sustained in a modern conventionally driven tracked vehicle by the use of mechanical power regeneration. Differential gears and cross-shafts are used to control the relative speeds of the tracks and transfer the braking power from the inner track to the outer track to sustain the turn. Similar considerations apply for skid steered wheeled vehicles.

A number of electric track drive arrangements use a separate electric motor to drive each track. This arrangement is commonly known as a two-line system. The regenerative steering power in such a system must be handled electrically resulting in the need for use of oversized motors and power converters. (For example the mechanical power measured at the outer track drive sprocket of a main battle tank, in a medium to high speed turn can be around 2500 kW when the engine power is only approximately 1000 kW.) An alternative approach for electric drive to the two line-line system uses the same mechanical regenerative arrangement as in a conventional transmission combined with an electric drive. This arrangement is sometimes referred to as a cross-shaft electric drive system and is illustrated in FIG. 1. U.S. Pat. No. 4,998,591 discloses an electric drive system of this layout.

In this arrangement, the steer cross-shaft runs across the vehicle outside the propulsion motor. This increases the size of the assembly and requires a number of idler gears. If a gear change is to be used the propulsion cross-shaft must be separate from the motor shaft. This can be achieved by making the motor shaft hollow and passing the cross-shaft through. This however increases the diameter of the motor bearings making a high-motor speed, desirable for good power density, difficult to achieve. The propulsion cross-shaft could be mounted outside the motor, or the motor mounted outside the propulsion cross shaft, increasing the package size and adding the need for idler gears increasing complexity and reducing efficiency.

U.S. Pat. No. 4,998,591 also discloses a drive configuration that uses a single differential mounted centrally and driven by a single propulsion motor. The differential is identical to a single differential in a conventional wheel driven car or truck axle. The torque from the drive motor is divided equally between the two half shafts which can rotate at different speeds relative to one another. On each half shaft is mounted a steer motor. To steer the vehicle, the inside steer motor must act as a brake and the outside steer motor (must apply additional driving torque to generate the required large track drive force difference across the vehicle to cause the vehicle to skid steer. As the two steer motors are operating at the speed of the shafts and are handling high torque when the vehicle is turning they are operating at high power, one regenerating and one driving. The system therefore, is not a mechanically regenerating system and has the same disadvantages as a two line system in that over sized motors are required.

U.S. Pat. No. 5,168,946 discloses a drive configuration similar to a conventional tank gearbox but does not use a steer cross-shaft. The disclosed arrangement uses three motors and a brake. For low speed operation, the brake is applied and a central motor is de-energised. The vehicle then drives as a two-line system at low speeds. At higher speeds the brake is released and the central motor drives increasing the speed range and introducing mechanical regenerative steering through the central motor shaft. In order for this system to work as described in that document, the outer two motors would need large torque and power ratings giving little advantage over a purely two-line system as previously described.

U.S. Pat. No. 2,730,182 describes a controlled differential device. French patent FR 2,382,362 describes the operation of a controlled differential but does not appear to disclose a practical embodiment of such a device.

A controlled differential has the characteristics that it couples two half shafts and controls their relative speeds. When the steer motor is stationary the two half shafts are simply coupled by the controlled differential so that they must run at the same speed. When the steer motor is rotated in one direction one half shaft is forced to run faster than the other. When the steer motor is rotated in the other direction the other half shaft is forced to run faster than the other. Operation of the steer motor at whatever speed the vehicle is travelling will therefore cause the vehicle to turn with steer powers regenerated across the vehicle by the torque produced in the cross-shafts, which supports the high track driving force difference between the inside and outside tracks.

U.S. Pat. No. 2,730,182 describes an arrangement using two long gears half meshing with each other and mounted on a common carrier, each meshing with an annular gear. Each annular gear is connected to a bevel gear which connects to the two half shafts. The steer motor acts through a worm and wheel on the carrier for the two long gears. Due to the use of bevel gears and the configuration for the two long meshing gears, such an arrangement would need to be large and heavy for a high power device.

The above described arrangements suffer from various disadvantages; including in some cases the need for over-rated motors to achieve steering, complex mechanical arrangements requiring multiple cross shafts and idler gears and/or complex motor configurations incorporating tubular shafts.

The present invention provides a novel drive configuration, which seeks to alleviate at least some of the problems described for the prior art.

In accordance with the present invention there is provided an electric drive configuration for a tracked or wheeled skid steered vehicle comprising:

an electric drive configuration comprising propulsion motors each in operable communication with one of a first pair of drive members operable to drive the tracks or two sets of wheels of a skid steered vehicle; and a steer motor in driveable communication with a controlled differential positioned between and connecting a pair of steering cross-shafts and in driveable communication with each cross-shaft, the ends of the steering cross-shafts remote from the controlled differential each being in driveable the tracks or wheels of the skid steered vehicle;

the first pair of drive members being engageable with the tracks or wheels at a first end of a skid steered vehicle and the second pair of drive members being engageable with the tracks or wheels at a position at or towards a second end of the vehicle.

For a tracked vehicle, the drive members are preferably drive sprockets and for a wheeled vehicle the members are preferably drive shafts.

Preferably, the propulsion motors each have a gear reduction and/or gear change unit associated therewith. It is also preferred that the drive members of the second pair each has a final drive gear reduction and a brake associated therewith for braking the vehicle and performing emergency steer functions.

The controlled differential may comprise any known controlled differential configuration but preferably comprises of a pair of epicyclical gear trains. More preferably, the controlled differential is a double epicyclical controlled differential as further described herein below.

The controlled differential device preferably comprises two epicyclical gear trains. In the preferred option the planet carriers of the two epicyclical gear trains are common, connected by a shaft running through two sun gears. The steer motor acts on the two sun gears either through a short cross-shaft two sets of spur gears and a reverse idler gear or by the use of bevel gears. The two output shafts from the controlled differential device, in this case connected to the propulsion motor shafts, are each coupled to the annuli of the epicyclical gear trains. This arrangement minimises the loads on the connections between the steering motor and the-epicyclical gear train, but increases the speed of the planet gears. Other desirable options are listed below.

In a further possible arrangement, the output shafts are connected to the annuli, the steer motor acts on the planet carriers and the sun gears are common.

In a further possible arrangement the output shafts are connected to the sun gears, the annuli are common and the steer motor acts on the planet carriers.

In a further possible arrangement, the motor shafts ear connected to the sun gears, the two planet carriers are common and the steer motor acts on the annuli.

In a further possible arrangement the output shafts are coupled to the planet carriers, the sun gears are common and the steer motor acts on the annuli.

In a further possible arrangement the output shafts are coupled to the planet carriers the annuli are common and the steer motor acts on the sun gears.

Other possibilities will no doubt occur to the skilled addressee without departure from the true scope of the invention as defined by the appended claims.

In one embodiment the novel drive configuration comprises two separate propulsion motors, gear reductions, and gear change units, each one nominally driving one track through a track drive sprocket as in a two-line system. A controlled differential is mounted at the opposite end of the vehicle and is connected to a second pair of track drive sprockets by two steering shafts. Each of the second pair of track drive sprockets also preferably incorporate a final drive gear reduction and a brake. A steer motor acting on the controlled differential then controls the relative speed of the two steering cross shafts and so the relative speeds of the two tracks to impose the steer function. The regenerative steering power is then transferred across the vehicle through the steering cross shafts via the controlled differential.

This arrangement greatly simplifies the construction of all of the components of the drive and steer system as each component's function is separated and each is distributed around the vehicle. The drive system makes best use of the space within the vehicle as a large proportion of the components can be mounted inside the track drive sprockets. Good utilisation of the space within the track sprockets is difficult in conventional designs, especially when gear reductions braking and steering cross shafts must be accommodated in the system.

The motors are preferably electrical.

For the purposes of exemplification, some embodiments of the invention will now be described with reference to the following drawings in which.

Figure 1:
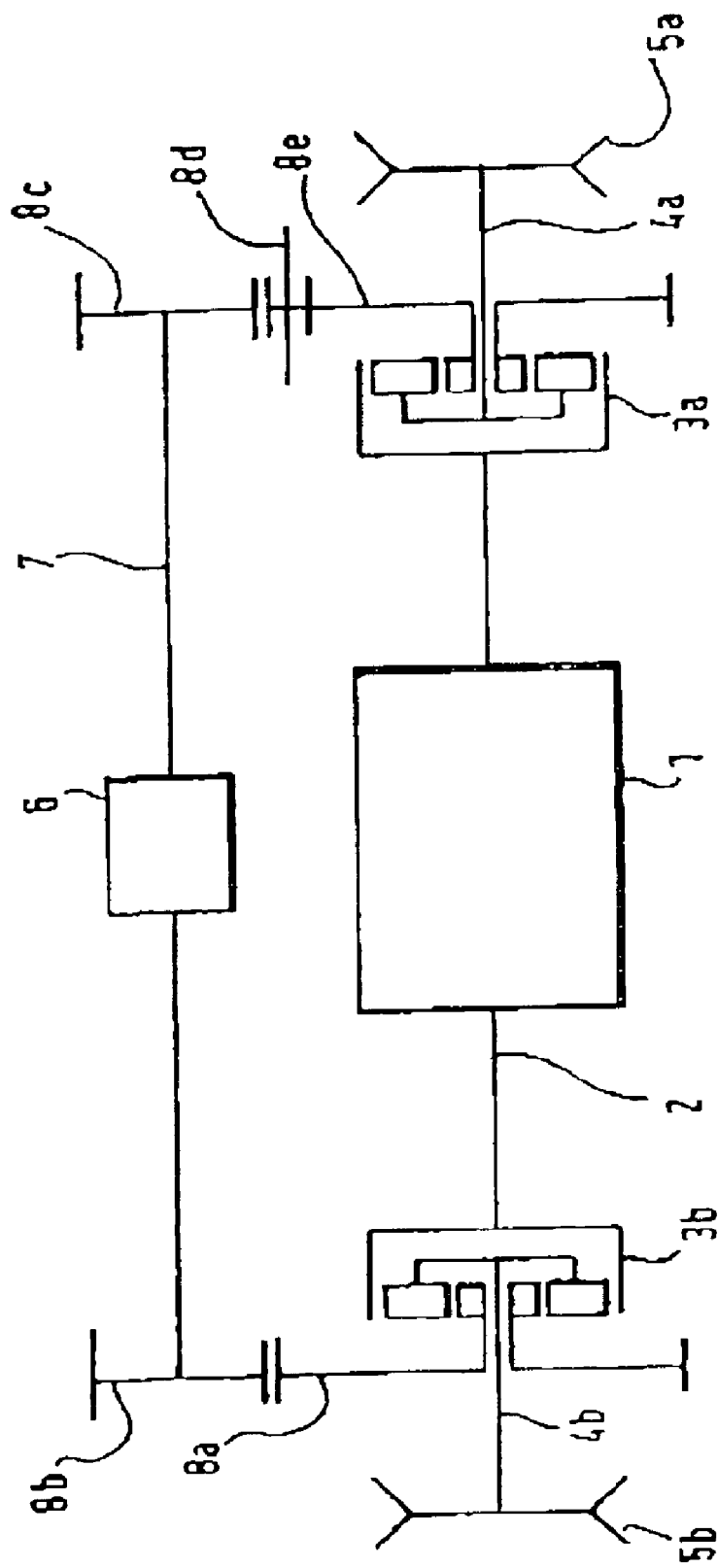
FIG. 1 shows a prior art drive configuration for a tracked vehicle.

As can be seen from FIG. 1, the prior art drive configuration comprises a propulsion motor (1) mounted on a cross-shaft (2) which is coupled to the annuli of two epicyclical steer differentials (3a, 3b). Planet carriers of the two epicyclical steer differentials are connected to output shafts (4a and 4b) and track drive sprockets (5a and 5b). A steer motor (6) is mounted on a steer cross shaft (7). The steer cross shaft is coupled to the sun gears of the steer epicyclical differentials by a number of spur gears (8a, 8b, 8c, and 8e). An extra spur gear (8d) is used on one side to reverse the rotation of the sun gear. This layout is identical to that used in a conventional mechanical drive tank transmission, the propulsion motor is fitted in place of the gear range change pack and the hydraulic steer motor has been substituted for a electric motor. This is the basis of the electric drive shown in U.S. Pat. No. 4,998,591.

Figure 2:
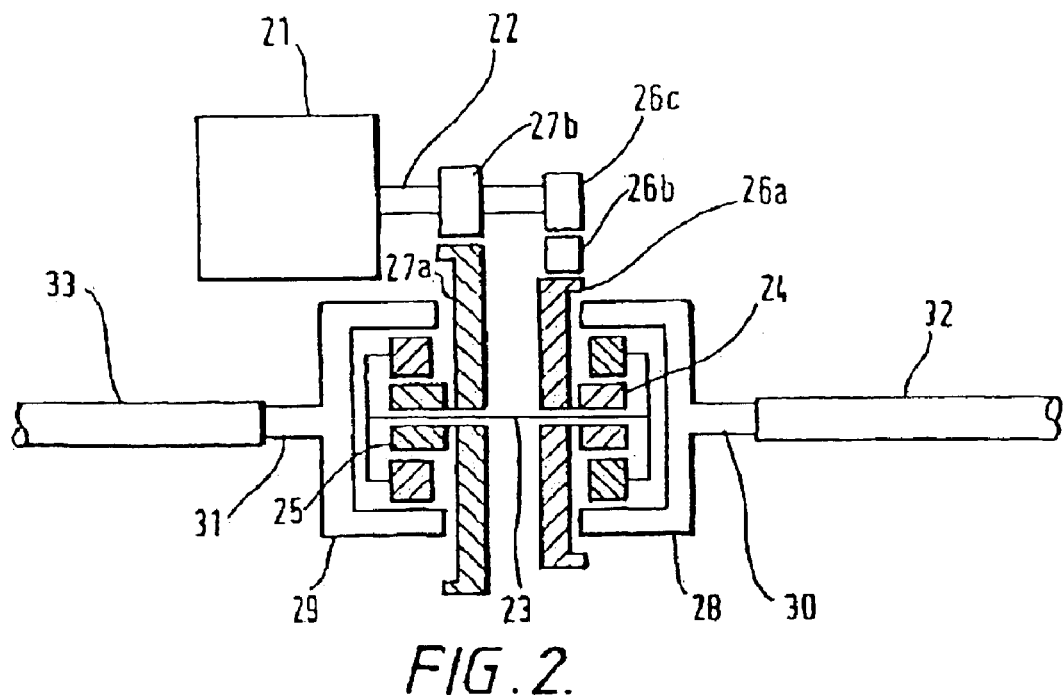
FIG. 2 shows a first controlled differential configuration suitable for use in an embodiment of the invention.

The controlled differential illustrated in FIG. 2 comprises a steer motor (21) mounted on a cross-shaft (22). A pair of epicyclical gear trains are arranged such that two planet carriers are connected by a shaft (23) which passes through centre of two sun gears (24 and 25). The sun gears (24, 25) are in turn coupled with spur gears (26a, 26c, 27a, 27b) to the steering shaft. An extra idler gear (26b) is used on one side to reverse the direction of rotation of the sun gear. The two annuli (28, 29) of the epicyclical gear trains are coupled to the output shafts (30, 31) of the controlled differential and are shown connected to the two steer cross shafts (32, 33).

Figure 3:
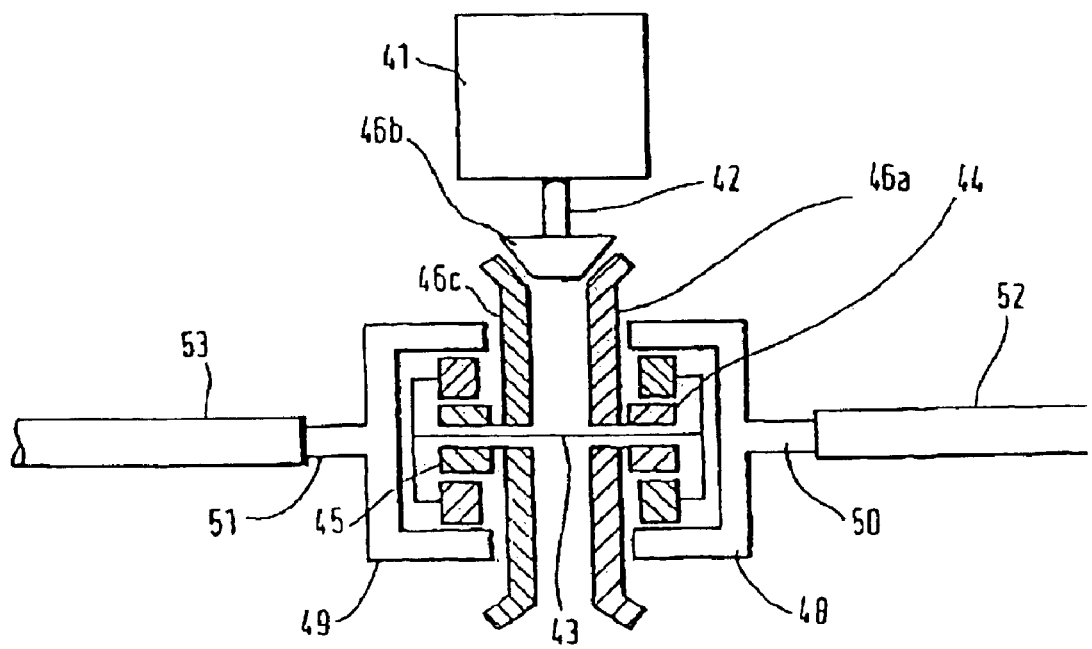
FIG. 3 shows a second controlled differential configuration suitable for use in an embodiment of the invention.

The second controlled differential arrangement illustrated in FIG. 3 comprises a steer motor (41) with an output shaft (42). A pair of epicyclical gear trains are arranged such that two planet carriers are connected by a shaft (43) which passes through the centre of two sun gears (44 and 45). The sun gears (44, 45) are in turn coupled with bevel gears (46a, 46b, 46c) to the steering motor output shaft. The two annuli (48, 49) of the epicyclical gear trains are coupled to the output shafts (50, 51) of the controlled differential and are shown connected to the two steering cross shafts (52, 53).

Figure 4:
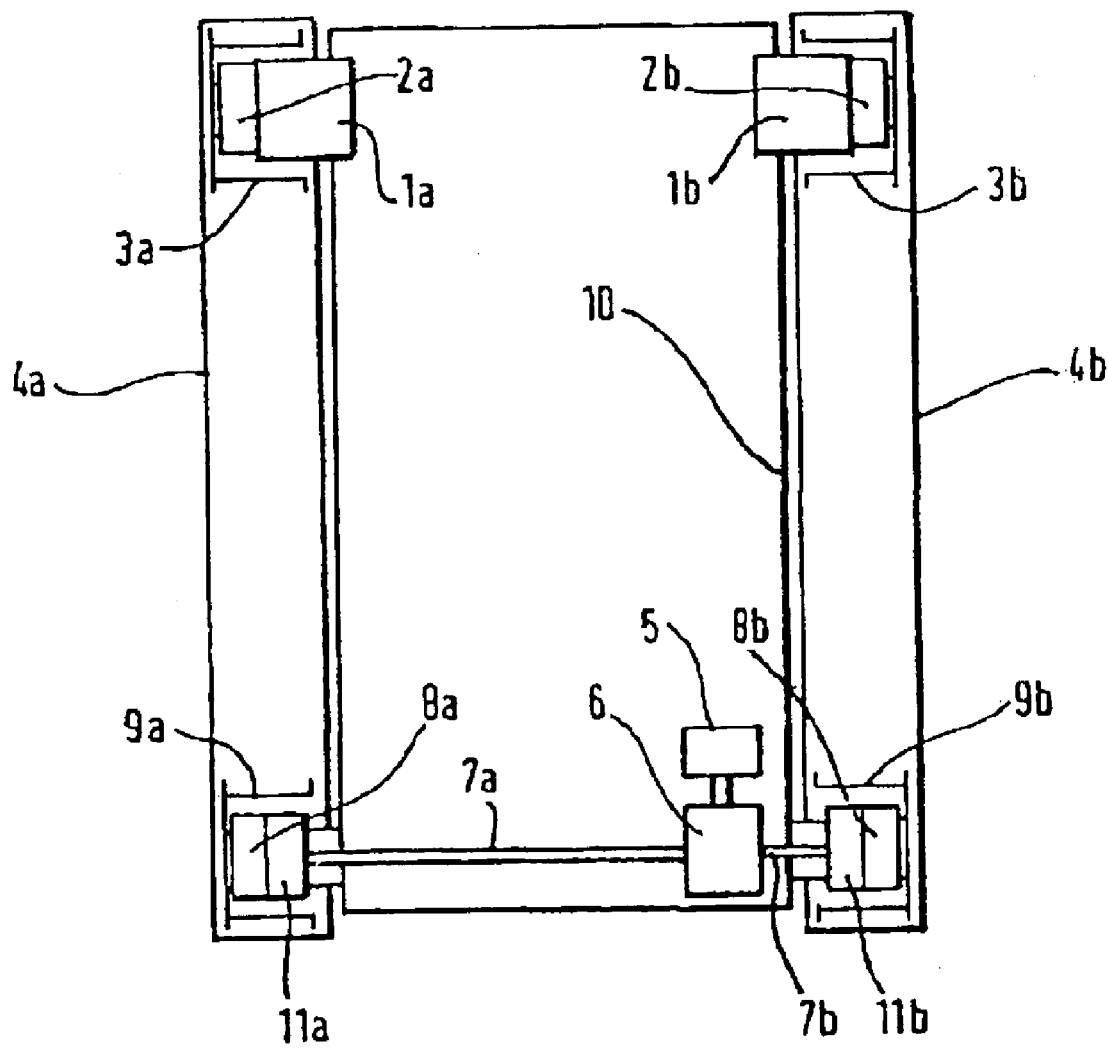
FIG. 4 shows an embodiment of a drive configuration of a tracked vehicle in accordance with the invention.

The embodiment illustrated in FIG. 4 comprises a first pair of track drive sprockets (3a, 3b) positioned to the rear of a tracked vehicle hull (10) and a second pair of track drive sprockets (9a, 9b) positioned to the front of the vehicle hull (10). In driveable communication with each of the first pair of track drive sprockets (3a, 3b) is a propulsion motor (1a, 1b) and an associated gear reduction/gear change unit (2a, 2b). The propulsion motors (1a, 1b) and gear reduction/gear change units (2a, 2b) operate to drive the track drive sprockets (3a and 3b) which engage with the tracks (4a, 4b) allowing the vehicle to be driven.

To the front and centre of the hull (10), is a steer-motor (5) which is used to operate a controlled differential (6). The controlled differential (6) is in driveable communication with the two steer cross-shafts (7a, 7b). The two shafts (7a, 7b) each extend to the second pair of track drive sprockets (9a, 9b). Also associated with the track drive sprockets (9a, 9b) are final drive gear reduction units. (8a, 8b) and brakes (11a, 11b).

When the vehicle runs in a straight line the steer motor (5) is stationary and the two halves of the cross-shaft (7a, 7b) are coupled together via the controlled differential (6) to rotate at the same speed, causing the vehicle to run in a straight line. Both propulsion motors (1a, 1b) drive the vehicle forward. The vehicle can be slowed by applying the brakes (11a, 11b) fitted in the front mounted sprockets (9a, 9b).

When the vehicle is steered the steer motor (5) drives the steer differentials (6) to increase speed to one cross-shaft (7a or 7b) and to reduce speed to the other shaft (7b or 7a); the speed difference is therefore imposed on the two tracks (4a, 4b), so causing the vehicle to steer. This produces a high torque in the cross-shafts (7a, 7b) which results in the transfer of regenerated braking power from the inside track to the outside track. During the steer manoeuvre both track drives (3a, 3b) at the rear of the vehicle continue to drive the vehicle forwards unlike a two line system where the inside motor brakes and the outside motor applies additional driving power to cause the vehicle to turn.

This arrangement has the benefit that the space within the track drive sprockets (3a, 3b, 9a, 9b) can be used to house the gear reductions (2a, 2b), the brakes (8a, 8b) and a proportion of the propulsion motors (1a, 1b). The only item left within the hull is the relatively small steer motor (5) and the controlled differential (6). If only one sprocket per track is used it is not practical to fit a brake, the gear reduction and propulsion motor into the sprocket. These components then must project into the hull (10) consuming valuable space. The separation of the drive, braking and steering components and the distribution around the vehicle greatly simplifies the design and construction of the individual parts reducing cost and improving reliability.

Advantages of the invention are achieved by the use of a track drive sprocket at each end of each track. This allows the fitting of a steering cross-shaft and controlled differential at one end of the vehicle and the drives at the other end. This greatly simplifies the packaging and design of the components and reduces the volume taken up in the hull of the vehicle.

Figure 5:
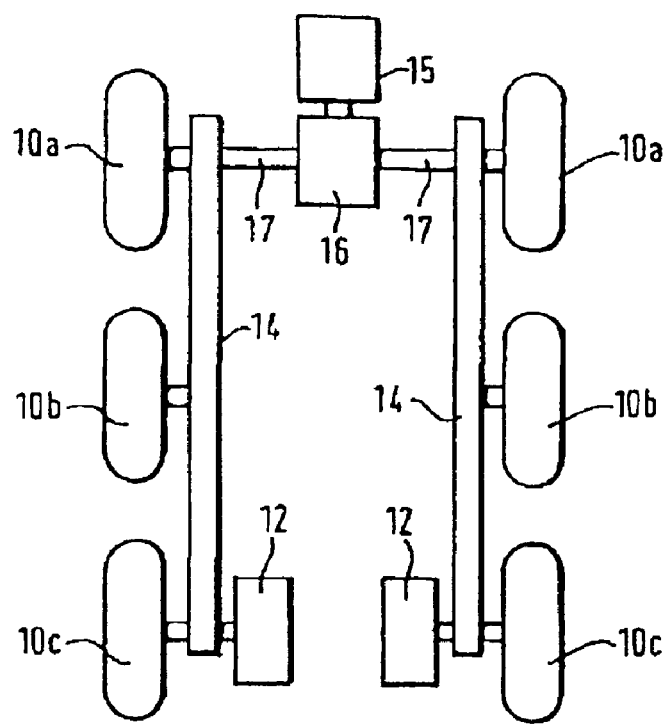
FIGS. 5 and 6 show embodiments of a drive configuration of a wheeled vehicle in accordance with the invention.

The embodiment shown in FIG. 5 is for a skid-steered wheeled vehicle. This embodiment comprises three pairs of wheels (10a), (10b) and (10c) spaced along the length of a vehicle hull. The wheels on each side of the vehicle hull are inter connected by transmission units (14). The transmission units may comprise chains, shafts and bevel gears, or spur gear chains. Other known transmission units may be employed. In driveable communication with the drive shafts of each wheel of the wheel pair (10c) via one of transmission units (14) is a propulsion motor (12) and an associated gear reduction/gear change unit. The propulsion motors (12) and gear reduction/gear change units operate to drive the wheel drive shafts allowing the vehicle to be driven.

To the front of the hull, is a steer motor (15) which is used to operate a controlled differential (16). The controlled differential (16) is in driveable communication with two halves of a steer cross-shaft (17). The two shafts (17) each extend to the second pair of drive shafts of the wheel pair (10a). Also associated with the drive shafts are final drive gear reduction units and brakes.

When the vehicle runs in a straight line the steer motor (15) is stationary and the two halves of the cross-shaft (17) are coupled together via the controlled differential (16) to rotate at the same speed, causing the vehicle to run in a straight line. Both propulsion motors drive the vehicle forward. The vehicle can be slowed by applying the brakes fitted in one or more of the wheel pairs.

When the vehicle is steered, the steer motor (15) drives the steer differential (16) to increase speed of one half of the cross-shaft (17) and to reduce speed to the other half of the shaft (17); the speed difference is therefore imposed on the wheels on each side of the vehicle so causing the vehicle to steer. This produces a high torque in the cross-shaft (17) which results in the transfer of regenerated braking power from the inside wheels to the outside wheels. During the steer manoeuvre both drive motors at the rear of the vehicle continue to drive the vehicle forwards unlike a two line system where the inside motor brakes and the outside motor applies additional driving power to cause the vehicle to turn.

Braking components, propulsion motors, gear reductions and/or gear change units could be packaged within the wheels of the skid steer vehicle to provide further vehicle packaging benefits.

Figure 6:
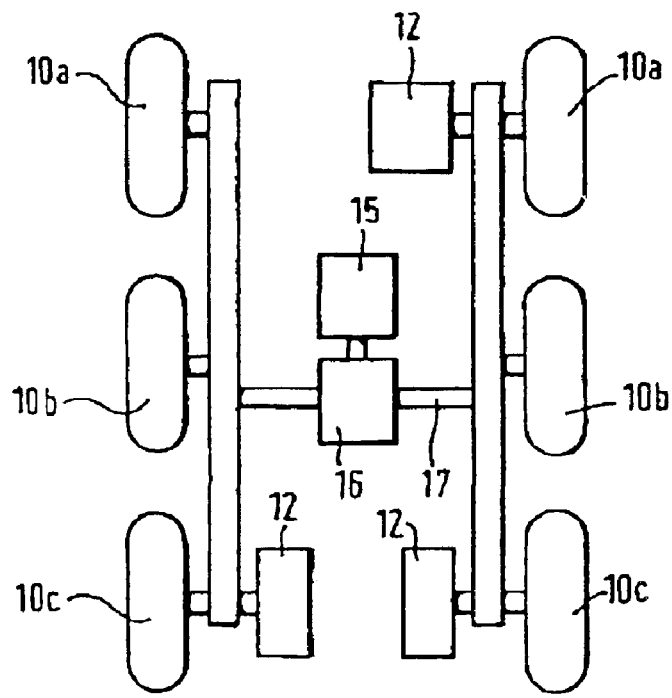

The embodiment illustrated in FIG. 6 is also for a wheeled skid steer vehicle and essentially differs from the FIG. 5 embodiment in that the steer motor (15) is connected via the controlled differential (16) and cross shaft (17) to the transmission units (14) thereby connecting the wheels on each side of the vehicle at a position other than at one end of the vehicle. Whereas three propulsion motors (12) and associated gear reduction and/or gear change units are illustrated in FIG. 6, more or less propulsion motors, gear reduction and gear change units may be employed. Furthermore, these may be connected to the transmission units at any point along the length of the vehicle.

Examples of vehicles that may benefit from the invention include, but are not limited to, military vehicles, farming machinery, remote controlled vehicles and robots.

Other embodiments of the invention will no doubt occur to the skilled addressee without departing from the true scope of the invention as claimed in the appended claims.

What is claimed is:

1. A drive configuration for a tracked or wheeled skid steered vehicle comprising propulsion motors each in operable communication with one of a first pair of drive members operable to drive the tracks or two sets of wheels of a skid steered vehicle; and a steer motor in driveable communication with a controlled differential positioned between and connecting a pair of steering cross-shafts and in driveable communication with each cross-shaft, the ends of the steering cross-shafts remote from the controlled differential being each in driveable communication with one of a second pair of drive members connected to drive the tracks or wheels of the skid steered vehicle; and characterized in that:

the first pair of drive members are engageable with the tracks or wheels at a first position along the length of a skid steered vehicle and the second pair of drive members are engageable with the tracks or wheels at a second position along the length of the vehicle.

2. A drive configuration as claimed in claim 1 wherein, for a tracked vehicle, the drive members are drive sprockets.

3. A drive configuration as claimed in claim 1 wherein, for a wheeled vehicle, the drive members are drive shafts.

4. A drive configuration as claimed in claim 1 wherein the propulsion motors each have a gear reduction and/or gear change unit associated therewith.

5. A drive configuration as claimed in claim 2 wherein the second pair of drive sprockets each have a brake associated therewith for braking the vehicle and/or performing emergency steer functions.

6. A drive configuration as claimed in claim 2 wherein the second pair of drive sprockets each have a final drive gear reduction associated therewith.

7. A drive configuration as claimed in claim 2 wherein the first pair of drive sprockets are positioned to the rear of a skid steered vehicle.

8. A drive configuration as claimed in claim 2 wherein the second pair of drive sprockets are positioned to the front of a skid steered vehicle.

9. A drive configuration as claimed in claim 1 wherein the controlled differential comprises a pair of epicyclical gear trains.

10. A drive configuration as claimed in claim 9 wherein the epicyclical gear trains are arranged to form a double epicyclical controlled differential having a common planet carrier.

11. A drive configuration as claimed in claim 10 wherein the planet carriers are joined by a common shaft passing between a pair of sun gears.

12. A drive configuration as claimed in claim 11 wherein the steer motor is in driveable communication with the double epicyclical controlled differential via set of bevel gears associated with the sun gears.

13. A drive configuration as claimed in claim 11 wherein the steer motor is in driveable communication with the double epicyclical controlled differential via a short cross shaft and a number of spur gears associated with the sun gears.

14. A drive configuration as claimed in claim 1 wherein said propulsion and steer motors are electrical.

* * * * *